United States Patent [19]

Yoshino

[11] E Re. 29,410

[45] Reissued Sept. 20, 1977

[54] PROCESS FOR MANUFACTURING OF DEODORIZING AIR FILTERS

[75] Inventor: Toshio Yoshino, Nishinomiya, Japan

[73] Assignee: C. Weinberger & Co., Ltd., Osaka, Japan

[21] Appl. No.: 610,819

[22] Filed: Sept. 5, 1975

Related U.S. Patent Documents

Reissue of:

[64] Patent No.: 3,857,732
Issued: Dec. 31, 1974
Appl. No.: 123,798
Filed: May 24, 1971

[30] Foreign Application Priority Data

May 23, 1970 Japan ..... 45-44204

[51] Int. Cl.[2] ..... B32B 27/12; C09D 3/76

[52] U.S. Cl. ..... 427/390 R; 55/316; 55/524

[58] Field of Search ..... 427/390; 23/25, 2 E, 23/4; 55/DIG. 5, 522, 524, 527, 528

[56] References Cited

U.S. PATENT DOCUMENTS

| | | | |
|---|---|---|---|
| 2,186,598 | 1/1940 | Bachman | 260/73 |
| 2,409,548 | 10/1946 | Debacher | 260/31.6 |
| 2,843,502 | 7/1958 | Fay | 427/390 UX |
| 3,627,567 | 12/1971 | Tensho | 428/85 |

*Primary Examiner*—Harry J. Gwinnell
*Attorney, Agent, or Firm*—Burgess, Dinklage & Sprung

[57] ABSTRACT

Process for manufacturing a deodorizing gas filter which comprises dissolving polyvinyl alcohol in water; adding to said solution at least one substance which is an amphoteric ion exchange resin, activated carbon or coconut shell charcoal, thereby forming a pasty mass; adding to said pasty mass glyoxal, in an amount in excess of that which would be sufficient to acetalize the polyvinyl alcohol, and a small amount of acid for the acetal formation; impregnating the resulting composition into a non-woven textile fabric gas filter; and heating said impregnated filter at about 70°-100° C for 30 minutes to 2 hours, thereby converting said polyvinyl alcohol to polyvinyl acetal.

7 Claims, No Drawings

PROCESS FOR MANUFACTURING OF DEODORIZING AIR FILTERS

Matter enclosed in heavy brackets [ ] appears in the original patent but forms no part of this reissue specification; matter printed in italics indicates the additions made by reissue.

This invention relates to gas filters. It more particularly refers to such filters which have a deodorizing capacity.

Gas, and particularly air, filters are employed in many household and commercial uses. For example, they form a necessary part of all forced air heating and cooling equipment such as furnaces and air conditioners. Further, they find use in oven exhaust hoods and other places.

To date, most air conditioning filters, and for that matter other air gas filters as well, have the capacity to eliminate dust and other particles from air passed therethrough but do not act in a deodorizing manner. It would of course be desirable to be able to eliminate or reduce such odorants as ammonia, amines, volatile fatty acids, hydrogen sulfide, mercaptans, skatole, indole and even sulfur dioxide from air while it is passing through the filter.

It is therefore an object of this invention to provide a novel gas filter which is not only capable of removing dust and the like from gases passed therethrough but is also capable of eliminating or reducing the level of offensive odorant contained in the gas.

Another object of this inventon is the provision of a process of producing such filter.

Other and additional objects of this invention will become apparent from a consideration of this entire specification including the claims hereof.

In accord with and fulfilling these objects, one aspect of this invention resides in a novel gas filter comprising a conventional non-woven fabric filter substrate having coated on the fibers thereof a substantially water insoluble composition comprising a polyvinyl acetal and at least one member selected from the group consisting of an amphoteric ion exchange resin, activated carbon and coconut shell charcoal. It is preferred in the practice of this invention to also have excess aldehyde in the composition which may be chemically bonded to the vinyl acetal polymer or not as desired, although it is preferably so bonded. It is also within the scope of this invention to include oxidation catalyst in the coated composition.

Another aspect of this invention is in the technique of preparing the novel filter described herein. This is accomplished by dissolving polyvinyl alcohol in water, preferably in a concentration of 5 to 13% by weight; adding thereto at least one of the group members activated carbon, coconut shell charcoal and an amphoteric ion exchange resin in powdered form, preferably of a mesh size of 150 to 400 and preferably in a proportion of about 7 to 15% by weight dissolving or slurrying such group member in said polyvinyl alcohol solution; and introducing into said solution or slurry an aldehyde which is reactive with at least a portion of the pendent alcohol groups of the polyvinyl alcohol. It is preferred that the aldehyde be a dialdehyde such as glyoxal or that it be an aldehydiccarboxylic acid so that after reaction with the hydroxyl groups of the polyvinyl alcohol there are pendent from the polymer back bone carboxylic acid moieties which are capable of reacting with the basic odorants such as the ammonia and the amines. Such aldehyde can be added to the solution or slurry in any proportions desired, whether in excess or deficiency as compared to the polyvinyl alcohol. Proportions of about 40 to 200% based upon the weight of polyvinyl alcohol originally dissolved have been found to be useful. Particularly preferred proportions of dialdehyde such as glyoxal are 60 to 80% by weight on the same basis. It may be convenient to incorporate a small amount of acid into the aldehyde containing composition in order to aid in the acetal formation.

The aqueous composition described above is in the form of a pasty mass of a viscosity of about 400 to 800 cp. This paste is impregnated into a conventional non-woven fabric filter and thus coated on the fibers thereof. Conventional filter material for gases, particularly air, is in the form of a random lay non-woven fabric. Such fabric is composed of a multiplicity of individual staple length fibers of any given length and denier. It is desirable to use staple fibers of small denier in order to have the highest possible filtering action. Filters may also be made of non-woven fabric composed of continuous filament. The non-woven fabric filters used in this invention have fibers or filaments that are randomly geometrically disposed with respect to each other and/or with respect to different parts of a given filament. The non-woven fabric is usually air layed but it may be water layed if desired. There may be used bonding materials impregnated into the non-woven fabric in order to insure the dimensional integrity of the filter batt.

The non-woven fabric filter uses fibers of nylon, cotton or other conventional synthetic or natural materials including foamed resinous materials.

According to this invention, one or more of the [Pulverized] *pulverized* deodorizing materials e.g. coconut shell charcoal, activated carbon or the amphoteric ion exchange resin are mixed with an aqueous solution of polyvinyl alcohol, converted into a paste, glyoxal or other aldehyde and a small amount of acid added to the paste, mixed to render such generally uniform and then impregnated into a filter fabric in a conventional impregnation procedure. The impregnated non-woven fabric is then heat treated at about 70° C to 100° C for about 30 minutes to 2 hours. After heat treatment, the impregnated filter fabric is washed with water and then dried by conventional procedures to a given moisture content.

Because of the fact that the deodorizer composition of this invention is impregnated into the filter fabric and adheres to the fibers thereof, it is not readily washed off even upon the application of dilute acid or alkali. Further, after use to deodorize ammonia, or other odorants, the filter of this invention can be regenerated by washing with alkali and/or acid, e.g. 5% caustic soda solution and 1% hydrochloric acid solution in a sequential treatment.

While not being bound by any particular theory of operation, it is believed that the glyoxal or other aldehyde reacts with the polyvinyl alcohol to form polyvinyl acetal not only in order to render the polymer water insoluble but also to yield pendent aldehyde groups which then are free to react with the basic odorants and chemically remove them from the air being filtered via an internal Cannizaro reaction to form glyoxylic acid salts. It is believed that one of the carbonyl groups of the glyoxal is converted to an acid while the other is converted to an alcohol in an internal redox system. The acid groups then react with the ammonia or amine to form a salt.

It has been found that there is a synergistic relationship between the amount of glyoxal and the amount of ammonia the deodorizing composition of this invention can remove from air. The following table shows this synergistic relationship.

| Amount of glyoxal (40%) employed against 3g polyvinyl alcohol (g) | Ammonia adsorption amount per gram of solid matter of deodorizer meq/g |
|---|---|
| 1 | 0.85 |
| 1.5 | 1.01 |
| 3 | 1.67 |
| 5 | 2.90 |

The use of amphoteric ion exchange resin is particularly advantageous where the odorants are water soluble gases because these resins have water trapped therein which dissolves the gaseous odorants and initiate their reaction with the polyvinyl acetal in the aqueous phase. It is, therefore, desirable to make the binder used to adhere the deodorizing resins or other materials to the fibers of the non-woven fabric gas filter of a hydrophilic character in order to insure that the deodorizing resins can accomplish their purpose.

In accord with this invention it is appropriate, where sulfur dioxide is to be removed from the air or other gas being filtered, that the filtering medium contain an appropriate oxidation catalyst such as an oxide of a multivalent metal. These materials are generally well known and widely available. They can be incorporated in the polyvinyl acetal impregnating composition or can be added to the filter fabric in separate impregnations. Exemplary of these oxidation catalysts are manganese dioxide, copper oxide and/or silver oxide. Where these catalysts are present in filtering medium and where sulfur dioxide is contained in the gases being filtered the sulfur dioxide combines with oxygen in the air in the presence of the catalysts and is converted to sulfur trioxide which in turn dissolves in water present in the deodorizing [resing] *resin* composition to form sulfuric acid which itself is adsorbed on the deodorizing resin. It should be understood that while the filter of this invention can be used to remove sulfur dioxide by the technique set forth above or can be used to remove various nitrogenous or other basic odorants from the air, it can also be used for both uses simultaneously and in this regard its use and incorporation for one purpose in no way detracts from its use and incorporation for the other purpose.

The invention is illustrated by the following examples in which parts and proportions are by weight unless expressed specifically to the contrary. These examples are not considered to limit the scope of this invention. The latter are illustrative thereof.

EXAMPLE 1

A deodorizing resin having amphoteric ion exchange groups obtained by condensing m-phenylene diamaine and phenols with formalin in the presence of acid catalysts was dried and converted into a fine powder of not more than 200 mesh 5g of such powder (used as a deodorizer) and 35g of water were added to 3.5 grams of polyvinyl alcohol (polymerization degree about 2000) and the mixture was dissolved under heating. The resultant polyvinyl alcohol solution, admixed with aforesaid deodorizer, was cooled to room temperature and 5g glyoxal (40%) and 1cc 1N hydrochloric acid were added thereto whereupon converting such into a paste.

The paste was impregnated to 5g of synthetic fiber non-woven fabric and the thus impregnated fabric was heated at 80° C for 30 minutes. After this heat treatment, the filter product was washed with running water for more than one hour and then was dried to a moisture content of 50% (dry base). The absorption capacity of the filter element was tested by placing such in a 2cm-diameter, 25cm-high column and passing same gases — 1000ppm in case of ammonia and 7000ppm in case of acetic acid-therethrough at a fluid velocity of 0.7 1l/min.

| | | | |
|---|---|---|---|
| ammonia | adsorption | amount | 1.67 meq/g |
| acetic acid | adsorption | amount | 10.01 meq/g |

Aforesaid values represent adsorption capacities per unit weight of deodorizer and binder composition adhering to the non-woven fabric.

In order to test durability of the deodorizing air filter, the filter element was immersed in 5% caustic soda and 1% hydrochloric acid alternatively for one hour and after repeating the operation seven times, the measured adsorption capabilities thereof showed no substantial reduction as compared to the initial capacity for adsorption of odorant.

EXAMPLE 2

The adsorption capacity of the air filter made as per Example 1 by using 3g fine powder of coconut shell charcoal, 3g polyvinyl alcohol, 5g glyoxal, and 1cc 1N hydrochloric acid, was as follows:

| | |
|---|---|
| amount of ammonia adsorption | 1.16 meq/g |
| amount of acetic acid absorption | 4.58 meq/g |

EXAMPLE 3

50g polyvinyl alcohol was dissolved into 543g water and to the resulting solution there was added 60g of an amphoteric ion exchange deodorizing resin powder, 10g activated carbon powder, and 20g [manganesdioxide] *maganesedioxide.*

Then, 85g glyoxal was added to the mixture.

The resulting paste was impregnated into a nylon-base non-woven fabric and the impregnated fabric was heated at 100° C for 2 hours.

The amount of deodorizer composition adhering to the air filter was about 130g over $1m^2$ area.

The deodorizing capacity of the air filter was as follows:

| | | |
|---|---|---|
| ammonia | 5.25 meq/g | adsorption capability per gram of deodorizer adhering to the non-woven cloth |
| acetic acid | 8.29 meq/g | |
| sulfur dioxide | 1.26 meq/G | |

What is claimed is:

1. Process for manufacturing a deodorizing gas filter which comprises dissolving polyvinyl alcohol in water; adding to said solution at least one substance which is an amphoteric ion exchange resin, activated carbon or coconut shell charcoal, thereby forming a pasty mass; adding to said pasty mass glyoxal in the amount in excess of that which would be sufficient to acetalize the polyvinyl alcohol, and a small amount of acid for the acetal formation; impregnating the resulting composition into a non-woven textile fabric gas filter; and heating said impregnated filter at about 70°–100° C for 30 minutes to 2 hours, thereby converting said polyvinyl alcohol to polyvinylacetal.

2. Process as claimed in claim 1 wherein [the fibers of said non-woven fabric] *said gas filter is a non-woven textile fabric gas filter, the fibers of which* are nylon.

3. Process as claimed in claim 1 wherein said substance is an amphoteric ion exchange resin and wherein said composition is hydrophilic.

4. Process as claimed in claim 1 wherein said substance is an amphoteric ion exchange resin.

5. Process as claimed in claim 1 wherein said substance is activated carbon.

6. Process as claimed in claim 1 wherein said substance is coconut shell charcoal.

*7. Process as claimed in claim 1, wherein said non-woven textile fabric gas filter utilizes the fibers of at least one of nylon, cotton or other conventional synthetic or natural materials including foamed resinous materials.*

* * * * *

UNITED STATES PATENT OFFICE
CERTIFICATE OF CORRECTION

Patent No. Re. 29,410 Dated September 20, 1977

Inventor(s) Toshio Yoshino

It is certified that error appears in the above-identified patent and that said Letters Patent are hereby corrected as shown below:

On the cover sheet (Item 73) Assignee should read:

-- Nippon Kasei, Ltd., Fukatsu-cho, Japan --.

Column 1, line 67, "...diccarboxyic" should read -- dicarboxylic --.

Column 4, line 15, "ll/min" should read -- l/min --.

Signed and Sealed this

*Third* Day of *October 1978*

[SEAL]

*Attest:*

RUTH C. MASON
*Attesting Officer*

DONALD W. BANNER
*Commissioner of Patents and Trademarks*